US012671325B2

(12) United States Patent
Li et al.

(10) Patent No.: US 12,671,325 B2
(45) Date of Patent: Jun. 30, 2026

(54) LLC RESONANT CONVERTER AND CONTROL METHOD THEREFOR

(71) Applicant: MORNSUN GUANGZHOU SCIENCE & TECHNOLOGY CO., LTD., Guangzhou (CN)

(72) Inventors: Yongchang Li, Guangzhou (CN); Zhishen Wang, Guangzhou (CN); Hui Wu, Guangzhou (CN); Zhiqun Yin, Guangzhou (CN)

(73) Assignee: MORNSUN GUANGZHOU SCIENCE & TECHNOLOGY CO., LTD., Guangzhou (CN)

( * ) Notice: Subject to any disclaimer, the term of this patent is extended or adjusted under 35 U.S.C. 154(b) by 229 days.

(21) Appl. No.: 18/692,723

(22) PCT Filed: Sep. 16, 2022

(86) PCT No.: PCT/CN2022/119251
§ 371 (c)(1),
(2) Date: Mar. 15, 2024

(87) PCT Pub. No.: WO2023/041019
PCT Pub. Date: Mar. 23, 2023

(65) Prior Publication Data
US 2024/0380317 A1     Nov. 14, 2024

(30) Foreign Application Priority Data
Sep. 18, 2021     (CN) .......................... 202111113085.0

(51) Int. Cl.
| | | |
|---|---|---|
| *H02M 3/00* | (2006.01) | |
| *H02M 1/00* | (2007.01) | |
| *H02M 3/335* | (2006.01) | |

(52) U.S. Cl.
CPC ........... *H02M 3/01* (2021.05); *H02M 1/0058* (2021.05); *H02M 3/33571* (2021.05); *H02M 3/33573* (2021.05)

(58) Field of Classification Search
CPC .. H02M 1/0058; H02M 3/01; H02M 3/33571; H02M 3/33573
See application file for complete search history.

(56) References Cited

U.S. PATENT DOCUMENTS 9,960,689 B1 *  5/2018  Lu ........................... H02M 3/01

FOREIGN PATENT DOCUMENTS

| CN | 109687720 A | * | 4/2019 | .......... H02M 3/3385 |
| CN | 110649812 A | * | 1/2020 | ........ H02M 3/33507 |

(Continued)

OTHER PUBLICATIONS

CN109687720A_Translation (Year: 2019).*

(Continued)

*Primary Examiner* — Crystal L Hammond
*Assistant Examiner* — Jennifer C Caulk
(74) *Attorney, Agent, or Firm* — Maschoff Brennan

(57) ABSTRACT

A control method for an LLC resonant converter includes: dividing an input voltage into four voltage segments: a low voltage, a medium-low voltage, a medium-high voltage, and a high voltage, and correspondingly adopting a full-bridge PFM control mode, a full-bridge PWM control mode, a half-bridge PFM control mode, and a half-bridge PWM control mode respectively. This control method is applicable to a wide input voltage range to achieve steady-state control over an LLC resonant converter, and can maintain a high efficiency of the LLC resonant converter within the whole input voltage range and can also be used in scenarios where a wide output voltage occurs.

6 Claims, 4 Drawing Sheets

(56)         References Cited

FOREIGN PATENT DOCUMENTS

| | | | | | |
|---|---|---|---|---|---|
| CN | 110707931 | A | | 1/2020 | |
| CN | 110768535 | A | * | 2/2020 | ........ H02M 3/33507 |
| CN | 112087147 | A | | 12/2020 | |
| CN | 112436721 | A | * | 3/2021 | ........ H02M 7/53871 |
| WO | 2021/042773 | A1 | | 3/2021 | |

OTHER PUBLICATIONS

CN110649814A_Translation (Year: 2020).*
CN110768535A_Translation (Year: 2020).*
CN112436721A (Year: 2021).*
PCT International Search Report issued in corresponding application No. PCT/CN2022/119251, dated Oct. 24, 2022.
PCT Written Opinion issued in corresponding application No. PCT/CN2022/119251, dated Oct. 24, 2022.

* cited by examiner

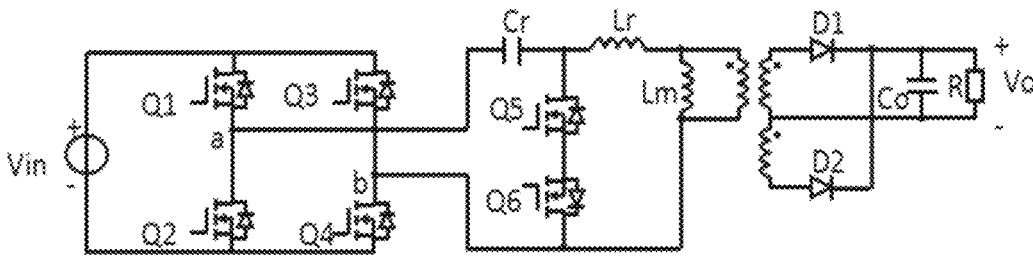
FIG. 1
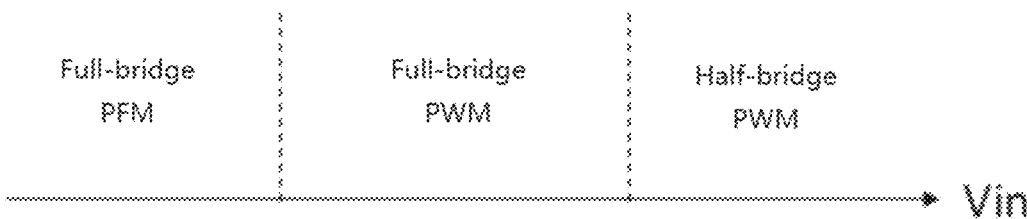
FIG. 2
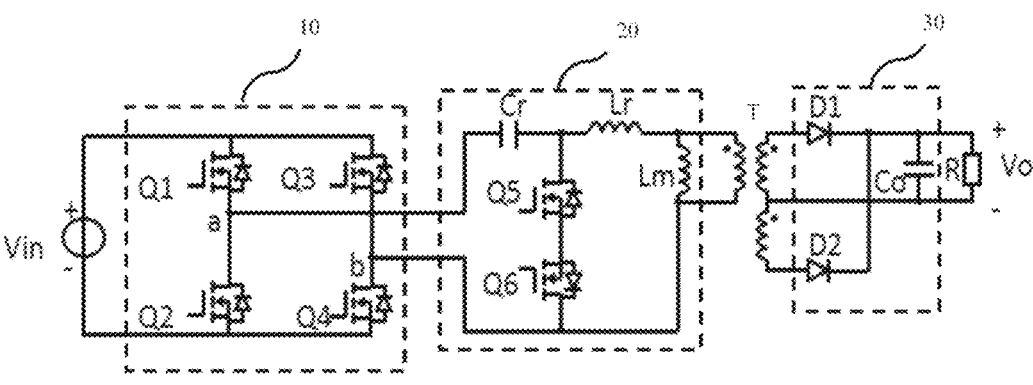
FIG. 3
FIG. 4

LLC RESONANT CONVERTER AND CONTROL METHOD THEREFOR

TECHNICAL FIELD

The present invention relates to the field of switch converter control, and in particular, to an LLC resonant converter and a control method therefor.

BACKGROUND

Since an LLC resonant circuit can implement zero-voltage switching (ZVS) and quasi-zero current switching (ZCS) of a switch tube, the LLC resonant circuit is often used in high-frequency and high-power density converters. When a switch frequency deviates from a resonant frequency, ZCS cannot be implemented. When the switch frequency deviates further from the resonant frequency, a current used when a primary switch is turned off is greater, and the efficiency is lower. Therefore, an LLC resonant transformer using conventional control solutions has the problem of a narrow input voltage range.

In the paper "On-the-Fly Topology-Morphing Control Efficiency Optimization Method for LLC Resonant Converters Operating in Wide Input- and/or Output-Voltage Range", Milan M. Jovanovic uses the half-bridge and full-bridge switching solution for traditional LLC topology, so that the LLC can work in a wide input voltage with a ratio of the highest input voltage to the lowest input voltage of 4:1. In the paper, a bridge arm MOS tube is used to drive the gradual change of a duty cycle, so that a converter can smoothly switch between full bridge and half bridge. However, a frequency change range in the paper is large, and the lowest operating frequency is about ¼ of the highest operating frequency, which is not conducive to miniaturization design.

Refer to FIG. 1. FIG. 1 is a circuit diagram of an existing LLC resonant converter. Within the same input voltage range, an operating frequency range of this LLC resonant converter is narrower than that of a traditional LLC resonant converter without a clamping branch. In order to solve this problem, the Chinese patent with the publication number CN110768535A entitled "A Wide Gain Control Method for a Variable Topology LLC Resonant Converter" discloses a wide gain control method for an LLC resonant converter. The control method uses the following operating mode for the LLC resonant converter to improve efficiency: when an input voltage is low, the LLC resonant converter operates in a full-bridge PFM mode; when the input voltage is medium, the LLC resonant converter operates in a full-bridge PWM mode; and when the input voltage is high, the LLC resonant converter operates in a half-bridge PWM mode. A schematic diagram of the control method is shown in FIG. 2. Although the control method can broaden the input voltage range of the LLC resonant converter, when the voltage input is medium or high, the LLC resonant converter operates in the full-bridge PWM mode, and the operating efficiency is still low.

SUMMARY OF THE INVENTION

In view of this, the technical problem to be solved by the present invention is to propose a steady-state control method for an LLC resonant converter to solve the problem of low efficiency of the existing control method.

To solve the above technical problem, the technical solutions adopted by the present invention are as follows:

A control method for an LLC resonant converter is provided, where the LLC resonant converter has an inverter circuit, an LLC resonant circuit, a transformer, and a secondary-side rectifier filter circuit, the inverter circuit has a switch tube Q1, a switch tube Q2, a switch tube Q3, and a switch tube Q4, the drain electrode of the switch tube Q1 is connected to the drain electrode of the switch tube Q3 and a positive terminal of an input voltage, the source electrode of the switch tube Q1 is connected to the drain electrode of the switch tube Q2, the source electrode of the switch tube Q3 is connected to the drain electrode of the switch tube Q4, the source electrode of the switch tube Q2 and the source electrode of the switch tube Q4 are respectively connected to a negative terminal of the input voltage, and the control method includes:

dividing a range of the input voltage into a low voltage range, a medium-low voltage range, a medium-high voltage range, and a high voltage range; and correspondingly adopting different control modes for the LLC resonant converter in the low voltage range, the medium-low voltage range, the medium-high voltage range, and the high voltage range respectively; where when the input voltage is in the low voltage range, adopting a full-bridge PFM control mode for the LLC resonant converter;

when the input voltage is in the medium-low voltage range, adopting a full-bridge PWM control mode for the LLC resonant converter;

when the input voltage is in the medium-high voltage range, adopting a half-bridge PFM control mode for the LLC resonant converter; and when the input voltage is in the high voltage range, adopting a half-bridge PWM control mode for the LLC resonant converter.

In an embodiment, when the LLC resonant converter operates in the full-bridge PFM control mode or the half-bridge PFM control mode, operating frequencies of the switch tube Q1, the switch tube Q2, the switch tube Q3, and the switch tube Q4 are all lower than a resonant frequency constituted by a resonant inductor and a capacitor.

In an embodiment, the LLC resonant circuit has a resonant inductor, an excitation inductor, a capacitor, a switch tube Q5, and a switch tube Q6, the drain electrode of the switch tube Q5 is connected to one end of the capacitor, the source electrode of the switch tube Q5 is connected to the source electrode of the switch tube Q6, and the drain electrode of the switch tube Q6 is connected to the source electrode of the switch tube Q3; when the LLC resonant converter operates in the full-bridge PFM control mode, a duty cycle of a driving signal of the switch tube Q1 is 50%, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, the switch tube Q5 is continuously turned off, and the switch tube Q6 is continuously turned off;

when the LLC resonant converter operates in the full-bridge PWM control mode, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, a driving signal of the switch tube Q5 is complementary to that of the switch tube Q1, and a driving signal of the switch tube Q6 is complementary to that of the switch tube Q2;

when the LLC resonant converter operates in the half-bridge PFM control mode, a duty cycle of a driving signal of the switch tube Q1 is 50%, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, the switch tube Q5 is continuously turned off, and the switch tube Q6 is continuously turned off; and when the LLC resonant converter operates in the half-bridge PWM control mode, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, a driving signal of the switch tube Q5 is complementary to that of the switch tube Q1, and a driving signal of the switch tube Q6 is complementary to that of the switch tube Q2.

The present invention also provides a control method for an LLC resonant converter is provided, where the LLC resonant converter has an inverter circuit, an LLC resonant circuit, a transformer, and a secondary-side rectifier filter circuit, the inverter circuit has a switch tube Q1, a switch tube Q2, a switch tube Q3, and a switch tube Q4, the drain electrode of the switch tube Q1 is connected to the drain electrode of the switch tube Q3 and a positive terminal of an input voltage, the source electrode of the switch tube Q1 is connected to the drain electrode of the switch tube Q2, the source electrode of the switch tube Q3 is connected to the drain electrode of the switch tube Q4, the source electrode of the switch tube Q2 and the source electrode of the switch tube Q4 are respectively connected to a negative terminal of the input voltage, and the control method includes:

dividing a range of an output voltage of the secondary-side rectifier filter circuit into a low voltage range, a medium-low voltage range, a medium-high voltage range, and a high voltage range; and correspondingly adopting different control modes for the LLC resonant converter in the low voltage range, the medium-low voltage range, the medium-high voltage range, and the high voltage range respectively; where when the output voltage is in the low voltage range, adopting a half-bridge PWM control mode for the LLC resonant converter;

when the output voltage is in the medium-low voltage range, adopting a half-bridge PFM control mode for the LLC resonant converter;

when the output voltage is in the medium-high voltage range, adopting a full-bridge PWM control mode for the LLC resonant converter; and when the output voltage is in the high voltage range, adopting a full-bridge PFM control mode for the LLC resonant converter.

In an embodiment, the LLC resonant circuit has a resonant inductor, an excitation inductor, a capacitor, a switch tube Q5, and a switch tube Q6, the drain electrode of the switch tube Q5 is connected to one end of the capacitor, the source electrode of the switch tube Q5 is connected to the source electrode of the switch tube Q6, and the drain electrode of the switch tube Q6 is connected to the source electrode of the switch tube Q3; when the LLC resonant converter operates in the half-bridge PWM control mode, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, a driving signal of the switch tube Q5 is complementary to that of the switch tube Q1, and a driving signal of the switch tube Q6 is complementary to that of the switch tube Q2;

when the LLC resonant converter operates in the half-bridge PFM control mode, a duty cycle of a driving signal of the switch tube Q1 is 50%, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, the switch tube Q5 is continuously turned off, and the switch tube Q6 is continuously turned off;

when the LLC resonant converter operates in the full-bridge PWM control mode, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, a driving signal of the switch tube Q5 is complementary to that of the switch tube Q1, and a driving signal of the switch tube Q6 is complementary to that of the switch tube Q2; and when the LLC resonant converter operates in the full-bridge PFM control mode, a duty cycle of a driving signal of the switch tube Q1 is 50%, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, the switch tube Q5 is continuously turned off, and the switch tube Q6 is continuously turned off.

In an embodiment, the secondary-side rectifier filter circuit is a full-wave rectifier circuit or a full-bridge rectifier circuit.

In an embodiment, the control method is used in a bidirectional LLC resonant converter or a unidirectional LLC resonant converter.

In an embodiment, the control method is used in scenarios where constant voltage control or constant current control is required for the LLC resonant converter.

The present invention also provides an LLC resonant converter, configured to convert an input voltage into an output voltage;

when the input voltage is in a low voltage range, a full-bridge PFM control mode is adopted for the LLC resonant converter;

when the input voltage is in a medium-low voltage range, a full-bridge PWM control mode is adopted for the LLC resonant converter;

when the input voltage is in a medium-high voltage range, a half-bridge PFM control mode is adopted for the LLC resonant converter; and when the input voltage is in a high voltage range, a half-bridge PWM control mode is adopted for the LLC resonant converter.

The present invention also provides an LLC resonant converter, configured to convert an input voltage into an output voltage;

when the output voltage is in a low voltage range, a half-bridge PWM control mode is adopted for the LLC resonant converter;

when the output voltage is in a medium-low voltage range, a half-bridge PFM control mode is adopted for the LLC resonant converter;

when the output voltage is in a medium-high voltage range, a full-bridge PWM control mode is adopted for the LLC resonant converter; and when the output voltage is in a high voltage range, a full-bridge PFM control mode is adopted for the LLC resonant converter.

The traditional half-bridge solution is not efficient in a wide voltage range because only one voltage point in the input voltage range operates at a resonant frequency. Although the traditional full-bridge solution can improve efficiency by operating in both full-bridge and half-bridge states, during wide voltage input, the frequency variation range is large, which is not conducive to volume reduction and filter design. In this solution, since there are half-bridge and full-bridge working states, two input voltage points work at the resonant frequency within a wide input voltage range, so that the energy transmission efficiency of this solution is high. At the same time, this solution can work in PFM and PWM modes, and the frequency variation range is smaller than that of the PFM mode alone. In addition, in the medium-high input voltage range, CN110768535A works in the PWM mode, the duty cycle of the bridge arm tube is small, and the turn-off loss is large. However, this solution works in the PFM mode with a lower frequency and a smaller turn-off current, and therefore is more efficient. Based on the above characteristics, compared with the existing technology, the present invention has a narrow frequency variation range and high working efficiency within a wider input voltage range.

BRIEF DESCRIPTION OF THE DRAWINGS

The present invention is further described using the accompanying drawings, but the embodiments in the accompanying drawings do not constitute any limitation on the present invention. Those of ordinary skill in the art can obtain other accompanying drawings based on the following accompanying drawings without creative work.

FIG. 1 is a diagram of a circuit principle of an existing LLC resonant converter;

FIG. 2 is a schematic diagram of a control method for an existing LLC resonant converter;

FIG. 3 is a schematic diagram of a circuit of an LLC resonant converter of the present invention;

FIG. 4 is a schematic diagram of a control method for an LLC resonant converter of the present invention;

DETAILED DESCRIPTION

Figures 5, 6:
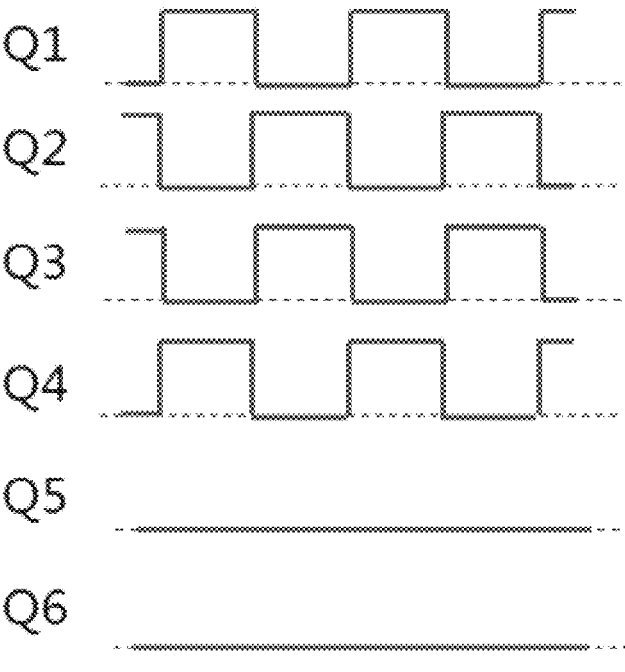
FIG. 5 is a control schematic diagram of a full-bridge PFM control mode of the present invention.
FIG. 6 is a control schematic diagram of a full-bridge PWM control mode of the present invention.

Further explanation will be given below based on specific solutions.

The control solution described below has a wide range of applications: it can be used for both clamping LLC circuits using full-wave rectification and for clamping LLC circuits using full-bridge rectification; can be used for both wide voltage input scenarios and wide voltage output scenarios; can be used in both constant voltage scenarios and constant current scenarios; and can be used in both unidirectional converters and bidirectional converters.

Embodiment 1

The following takes a constant-voltage output unidirectional converter with a wide input voltage as an example.

Refer to FIG. 3. The present invention provides an LLC resonant converter, which includes an inverter circuit 10, an LLC resonant circuit 20, a transformer T, and a secondary-side rectifier filter circuit 30.

The inverter circuit 10 has a switch tube Q1, a switch tube Q2, a switch tube Q3, and a switch tube Q4, the drain electrode of the switch tube Q1 is connected to the drain electrode of the switch tube Q3 and a positive terminal of an input voltage, the source electrode of the switch tube Q1 is connected to the drain electrode of the switch tube Q2, the source electrode of the switch tube Q3 is connected to the drain electrode of the switch tube Q4, and the source electrode of the switch tube Q2 and the source electrode of the switch tube Q4 are respectively connected to a negative terminal of the input voltage.

The LLC resonant circuit 20 includes a resonant inductor Lr, an excitation inductor Lm, a capacitor Cr, and a clamping branch composed of a switch tube Q5 and a switch tube Q6 connected in series. One end of the capacitor Cr is connected to the source electrode of the switch tube Q1, and the other end of the capacitor Cr is connected to one end of the resonant inductor Lr and the drain electrode of the switch tube Q5. The other end of the resonant inductor Lr is connected to one end of the excitation inductor Lm and a first end of the primary winding of the transformer T. A second end of the primary winding of the transformer T is connected to the other end of the excitation inductor Lm and the drain electrode of the switch Q6. The source electrode of the switch tube Q6 is connected to the source electrode of the switch tube Q5, and the drain electrode of the switch tube Q6 is connected to the source electrode of the switch tube Q3.

The secondary-side rectifier filter circuit is a full-wave rectifier circuit or a full-bridge rectifier circuit. In this implementation, the secondary-side rectifier filter circuit is a full-wave rectifier circuit, and is composed of a diode D1, a diode D2, and a capacitor Co.

The following describes the control method for an LLC resonant converter. An input voltage range is divided into a low voltage range, a medium-low voltage range, a medium-high voltage range, and a high voltage range; and different control modes are adopted for the LLC resonant converter in the four voltage ranges respectively; where when the input voltage is in the low voltage range, a full-bridge PFM control mode is adopted for the LLC resonant converter;

when the input voltage is in the medium-low voltage range, a full-bridge PWM control mode is adopted for the LLC resonant converter;

when the input voltage is in the medium-high voltage range, a half-bridge PFM control mode is adopted for the LLC resonant converter; and when the input voltage is in the high voltage range, a half-bridge PWM control mode is adopted for the LLC resonant converter.

Referring to FIG. 5, when the LLC resonant converter operates in the full-bridge PFM control mode, a duty cycle of a driving signal of the switch tube Q1 is 50%, a frequency ratio depends on the closed loop, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, the switch tube Q5 is continuously turned off, and the switch tube Q6 is continuously turned off. Operating frequencies of the switch tube Q1, the switch tube Q2, the switch tube Q3, and the switch tube Q4 are all lower than a resonant frequency constituted by a resonant inductor Lr and a capacitor Cr.

Referring to FIG. 6, when the LLC resonant converter operates in the full-bridge PWM control mode, the duty cycle of the drive signal of the switch tube Q1 depends on the closed loop, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, a driving signal of the switch tube Q3 is the same as that of the switch tube Q2, a driving signal of the switch tube Q4 is the same as that of the switch tube Q1, a driving signal of the switch tube Q5 is complementary to that of the switch tube Q1, and a driving signal of the switch tube Q6 is complementary to that of the switch tube Q2.

Figure 7:
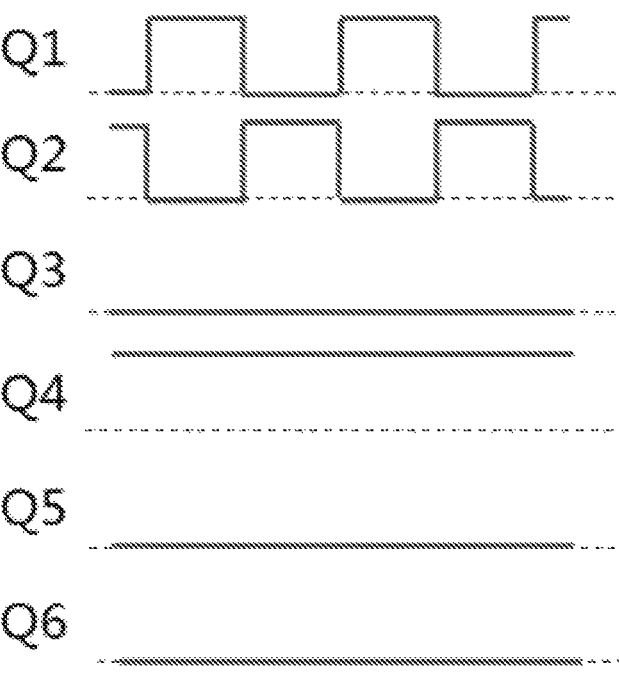
FIG. 7 is a control schematic diagram of a half-bridge PFM control mode of the present invention.

Referring to FIG. 7, when the LLC resonant converter operates in the half-bridge PFM control mode, a duty cycle of a driving signal of the switch tube Q1 is 50%, a frequency ratio depends on the closed loop, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, the switch tube Q5 is continuously turned off, and the switch tube Q6 is continuously turned off. Operating frequencies of the switch tube Q1, the switch tube Q2, the switch tube Q3, and the switch tube Q4 are all lower than a resonant frequency constituted by a resonant inductor Lr and a capacitor Cr.

Figure 8:
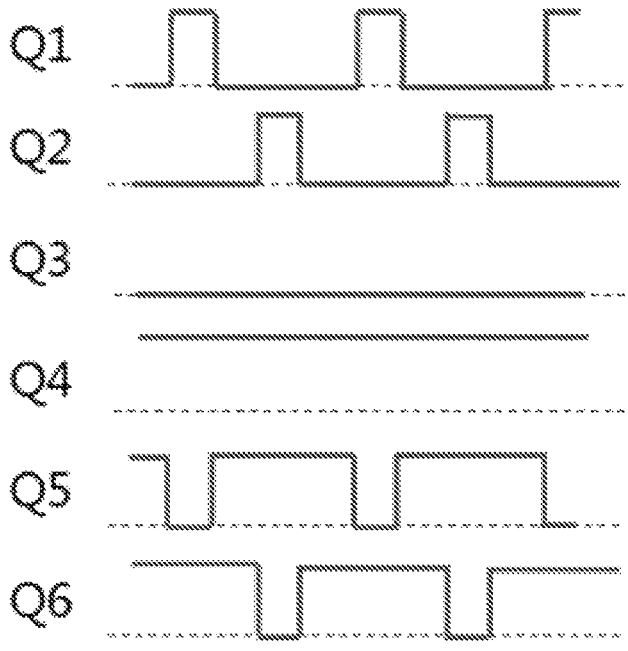
FIG. 8 is a control schematic diagram of a half-bridge PWM control mode of the present invention.

Referring to FIG. 8, when the LLC resonant converter operates in the half-bridge PWM control mode, the duty cycle of the driving signal of the switch tube Q1 depends on the closed loop, a frequency and a duty cycle of a driving signal of the switch tube Q2 are respectively the same as those of the driving signal of the switch tube Q1, a phase difference between the driving signal of the switch tube Q2 and the driving signal of the switch tube Q1 is 180°, the switch tube Q3 is continuously turned off, the switch tube Q4 is continuously turned on, a driving signal of the switch tube Q5 is complementary to that of the switch tube Q1, and a driving signal of the switch tube Q6 is complementary to that of the switch tube Q2.

Figure 9:
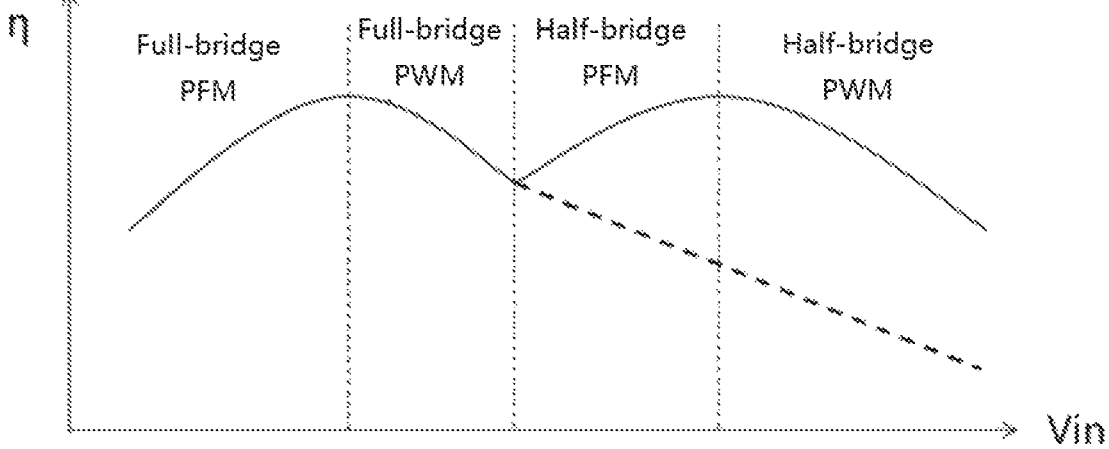
FIG. 9 is a comparison diagram of the efficiency of the existing control method and the control method of the present invention.

Referring to FIG. 9, the dotted line is the efficiency curve of the control method of the existing patent CN110768535A; and the solid line is the efficiency curve of the control method of the present invention. As can be seen from FIG. 9, the efficiency curve of the LLC resonant converter of the present invention is continuous within the whole input voltage range, and each of the full-bridge working area and the half-bridge working area has a voltage point that can work at the resonant frequency. Compared with the efficiency curve of the existing patent CN110768535A, the overall working efficiency of the LLC resonant converter of the present invention is higher. The reason is as follows: if full-bridge PWM control is used when the input voltage is high, the turn-off current of each switch tube is larger; therefore, the efficiency of the LLC resonant converter is lower. After switching to half-bridge PFM control, the turn-off current becomes smaller; therefore, the operating efficiency of the LLC resonant converter is improved.

Embodiment 2

This embodiment provides another control method for the LLC resonant converter in Embodiment 1. The control method includes:

dividing a range of an output voltage of the secondary-side rectifier filter circuit into a low voltage range, a medium-low voltage range, a medium-high voltage range, and a high voltage range; and adopting different control modes for the LLC resonant converter in the four voltage ranges respectively; where when the output voltage is in the low voltage range, adopting a half-bridge PWM control mode for the LLC resonant converter;

when the output voltage is in the medium-low voltage range, adopting a half-bridge PFM control mode for the LLC resonant converter;

when the output voltage is in the medium-high voltage range, adopting a full-bridge PWM control mode for the LLC resonant converter; and when the output voltage is in the high voltage range, adopting a full-bridge PFM control mode for the LLC resonant converter.

The specific working states of the half-bridge PWM control mode, half-bridge PFM control mode, full-bridge PWM control mode and full-bridge PFM control mode are the same as those described in implementation 1 and will not be described herein.

Through the above control method, the effects of Embodiment 1 can also be achieved, which will not be described herein.

It should be noted that the clamping resonant converter shown in FIG. 1 should not be regarded as a limitation on the specific circuit to which the present invention is applicable. Other types of resonant converters with clamping branches also have the problems described in the background, and the present invention is also applicable. For example, the resonant inductor Lr in FIG. 1 is moved between the center tap of the secondary-side winding and a connection point between an output filter capacitor Co and an output negative terminal Vo–, or the clamping branch formed by the switch tube Q5 and the switch tube Q6 is placed on the secondary side of the transformer.

The description of the above embodiments is only used to help understand the inventive concept of the present application, and is not intended to limit the present invention. Any modifications, equivalent substitutions, improvements, or the like made by those of ordinary skill in the art without departing from the principle of the present invention shall be included in the protection scope of the present invention.

The invention claimed is:

1. A control method for an LLC resonant converter, wherein the LLC resonant converter has an inverter circuit, an LLC resonant circuit, a transformer, and a secondary-side rectifier filter circuit, the inverter circuit has a power transistor Q1, a power transistor Q2, a power transistor Q3, and a power transistor Q4, the drain electrode of the power transistor Q1 is connected to the drain electrode of the power transistor Q3 and a positive terminal of an input voltage, the source electrode of the power transistor Q1 is connected to the drain electrode of the power transistor Q2, the source electrode of the power transistor Q3 is connected to the drain electrode of the power transistor Q4, the source electrode of the power transistor Q2 and the source electrode of the power transistor Q4 are respectively connected to a negative terminal of the input voltage, and the control method comprises:

dividing a range of an output voltage of the secondary-side rectifier filter circuit into a low voltage range, a medium-low voltage range, a medium-high voltage range, and a high voltage range; and correspondingly adopting different control modes for the LLC resonant converter in the low voltage range, the medium-low voltage range, the medium-high voltage range, and the high voltage range respectively; wherein when the output voltage is in the low voltage range, adopting a half-bridge PWM control mode for the LLC resonant converter;

when the output voltage is in the medium-low voltage range, adopting a half-bridge PFM control mode for the LLC resonant converter;

when the output voltage is in the medium-high voltage range, adopting a full-bridge PWM control mode for the LLC resonant converter; and when the output voltage is in the high voltage range, adopting a full-bridge PFM control mode for the LLC resonant converter.

2. The control method for an LLC resonant converter according to claim 1, wherein the LLC resonant circuit has a resonant inductor, an excitation inductor, a capacitor, a power transistor Q5, and a power transistor Q6, the drain electrode of the power transistor Q5 is connected to one end of the capacitor, the source electrode of the power transistor Q5 is connected to the source electrode of the power transistor Q6, and the drain electrode of the power transistor Q6 is connected to the source electrode of the power transistor Q3;

when the LLC resonant converter operates in the half-bridge PWM control mode, a frequency and a duty cycle of a driving signal of the power transistor Q2 are respectively the same as those of the driving signal of the power transistor Q1, a phase difference between the driving signal of the power transistor Q2 and the driving signal of the power transistor Q1 is 180°, the power transistor Q3 is continuously turned off, the power transistor Q4 is continuously turned on, a driving signal of the power transistor Q5 is complementary to that of the power transistor Q1, and a driving signal of the power transistor Q6 is complementary to that of the power transistor Q2;

when the LLC resonant converter operates in the half-bridge PFM control mode, a duty cycle of a driving signal of the power transistor Q1 is 50%, a frequency and a duty cycle of a driving signal of the power transistor Q2 are respectively the same as those of the driving signal of the power transistor Q1, a phase difference between the driving signal of the power transistor Q2 and the driving signal of the power transistor Q1 is 180°, the power transistor Q3 is continuously turned off, the power transistor Q4 is continuously turned on, the power transistor Q5 is continuously turned off, and the power transistor Q6 is continuously turned off;

when the LLC resonant converter operates in the full-bridge PWM control mode, a frequency and a duty cycle of a driving signal of the power transistor Q2 are respectively the same as those of the driving signal of the power transistor Q1, a phase difference between the driving signal of the power transistor Q2 and the driving signal of the power transistor Q1 is 180°, a driving signal of the power transistor Q3 is the same as that of the power transistor Q2, and a driving signal of the power transistor Q4 is the same as that of the power transistor Q1, a driving signal of the power transistor Q5 is complementary to that of the power transistor Q1, and a driving signal of the power transistor Q6 is complementary to that of the power transistor Q2; and when the LLC resonant converter operates in the full-bridge PFM control mode, a duty cycle of a driving signal of the power transistor Q1 is 50%, a frequency and a duty cycle of a driving signal of the power transistor Q2 are respectively the same as those of the driving signal of the power transistor Q1, a phase difference between the driving signal of the power transistor Q2 and the driving signal of the power transistor Q1 is 180°, a driving signal of the power transistor Q3 is the same as that of the power transistor Q2, a driving signal of the power transistor Q4 is the same as that of the power transistor Q1, the power transistor Q5 is continuously turned off, and the power transistor Q6 is continuously turned off.

3. The control method for an LLC resonant converter according to claim 1, wherein the secondary-side rectifier filter circuit is a full-wave rectifier circuit or a full-bridge rectifier circuit.

4. The control method for an LLC resonant converter according to claim 1, wherein the control method is used in a unidirectional LLC resonant converter.

5. An LLC resonant converter, configured to convert an input voltage into an output voltage, wherein when the output voltage is in a low voltage range, the LLC resonant converter is configured to operate in a half-bridge PWM control mode;

when the output voltage is in a medium-low voltage range, the LLC resonant converter is configured to operate in a half-bridge PFM control mode;

when the output voltage is in a medium-high voltage range, the LLC resonant converter is configured to operate in a full-bridge PWM control mode; and when the output voltage is in a high voltage range, the LLC resonant converter is configured to operate in a full-bridge PFM control mode.

6. The LLC resonant converter according to claim 5, wherein the LLC resonant converter has an inverter circuit, an LLC resonant circuit, a transformer, and a secondary-side rectifier filter circuit, the inverter circuit has a power transistor Q1, a power transistor Q2, a power transistor Q3, and a power transistor Q4, the drain electrode of the power transistor Q1 is connected to the drain electrode of the power transistor Q3 and a positive terminal of an input voltage, the source electrode of the power transistor Q1 is connected to the drain electrode of the power transistor Q2, the source electrode of the power transistor Q3 is connected to the drain electrode of the power transistor Q4, the source electrode of the power transistor Q2 and the source electrode of the power transistor Q4 are respectively connected to a negative terminal of the input voltage, the LLC resonant circuit has a resonant inductor, an excitation inductor, a capacitor, a power transistor Q5, and a power transistor Q6, the drain electrode of the power transistor Q5 is connected to one end of the capacitor, the source electrode of the power transistor Q5 is connected to the source electrode of the power transistor Q6, and the drain electrode of the power transistor Q6 is connected to the source electrode of the power transistor Q3.

\*   \*   \*   \*   \*